United States Patent [19]
Noble

[11] Patent Number: 5,700,020
[45] Date of Patent: Dec. 23, 1997

[54] SNOWMOBILE STEERING SKI

[76] Inventor: James K. Noble, 743 Iona Rd., Idaho Falls, Id. 83401

[21] Appl. No.: 664,808

[22] Filed: Jun. 17, 1996

Related U.S. Application Data

[63] Continuation of Ser. No. 106,344, Aug. 12, 1993, abandoned.

[51] Int. Cl.⁶ .................................................. B62B 17/02
[52] U.S. Cl. ............................................................ 280/28
[58] Field of Search .......................... 280/21.1, 22, 22.1, 280/28, 16, 845; 180/182

[56] References Cited

U.S. PATENT DOCUMENTS

| | | |
|---|---|---|
| 1,053,876 | 2/1913 | Riley et al. |
| 1,054,673 | 3/1913 | Charles . |
| 2,038,077 | 4/1936 | Haglund ................................. 208/184 |
| 3,252,533 | 5/1966 | Aeder et al. ............................. 180/5 |
| 3,593,814 | 7/1971 | Bauler ..................................... 180/5 |
| 3,632,126 | 1/1972 | Shorrock ................................. 280/28 |
| 3,643,978 | 2/1972 | Westberg ................................ 280/28 |
| 3,711,109 | 1/1973 | Hofbauer ................................ 280/28 |
| 3,732,939 | 5/1973 | Samson ................................ 180/5 R |
| 3,738,676 | 6/1973 | Hand ...................................... 280/22 |
| 3,773,343 | 11/1973 | Ambrose ............................... 280/28 |
| 3,774,926 | 11/1973 | Chase ..................................... 280/13 |
| 3,778,074 | 12/1973 | Kozlow .................................. 280/28 |
| 3,838,676 | 10/1974 | Kahelin ................................ 124/11 R |
| 3,877,713 | 4/1975 | Mabie et al. ........................... 280/28 |
| 3,942,812 | 3/1976 | Kozlow .................................. 280/28 |
| 4,077,639 | 3/1978 | Reedy ..................................... 280/28 |
| 4,225,147 | 9/1980 | Lowery ............................... 280/87.01 |
| 4,293,968 | 10/1981 | Levine .................................... 9/310 A |
| 4,595,211 | 6/1986 | Fitzpatrick ............................. 280/28 |
| 4,714,206 | 12/1987 | Nidiffer et al. ....................... 241/100 |
| 4,775,161 | 10/1988 | Bridges .................................. 280/16 |
| 4,919,441 | 4/1990 | Marier et al. ......................... 280/21.1 |
| 5,040,818 | 8/1991 | Metheny ............................... 280/609 |
| 5,135,249 | 8/1992 | Morris .................................. 280/609 |
| 5,145,195 | 9/1992 | Campbell et al. ..................... 280/28 |
| 5,165,709 | 11/1992 | Jacques ................................. 280/28 |
| 5,222,749 | 6/1993 | Bergstrom ............................. 280/28 |
| 5,344,168 | 9/1994 | Olson et al. ........................... 280/28 |

*Primary Examiner*—Richard M. Camby
*Attorney, Agent, or Firm*—Trask, Britt & Rossa

[57] ABSTRACT

An improved snowmobile steering ski attaches to the steering spindles of a snowmobile and generally includes a frame and an elongated ski having a protruding keel that emerges from the bottom running surface of the ski proximal a front end and gradually increases in protrusion with respect to the bottom running surface to a point of maximum protrusion at a point on the ski runner directly below the steering spindles of the snowmobile. The keel then gradually decreases in protrusion and merges back into the bottom surface proximal a rear end of the ski runner.

20 Claims, 4 Drawing Sheets

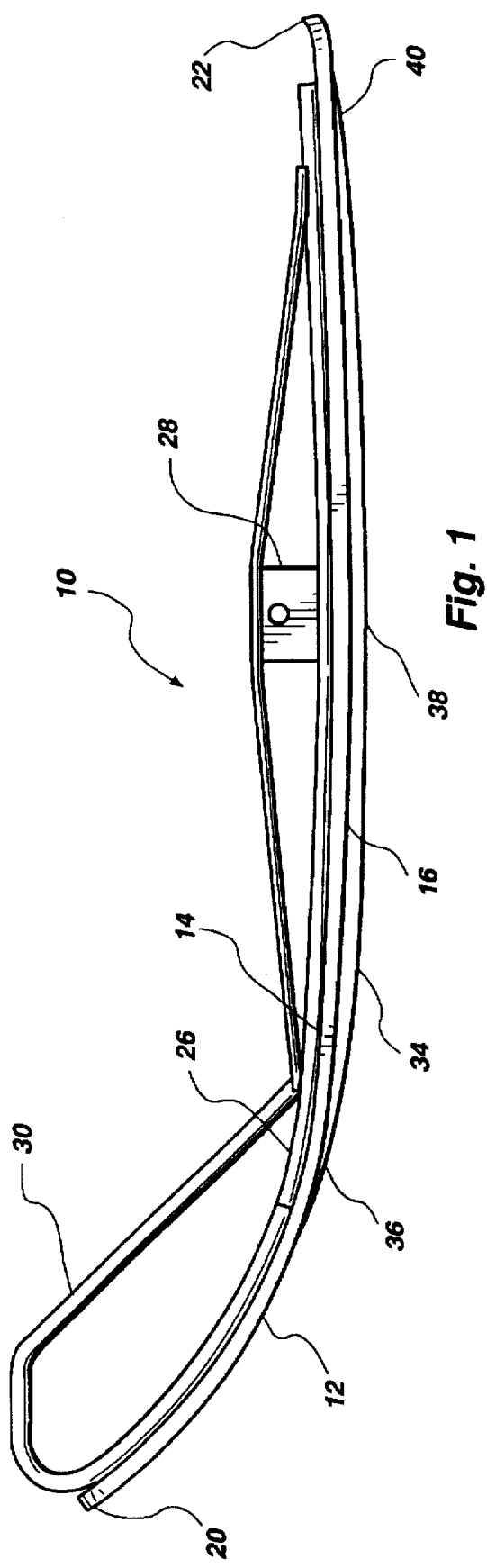
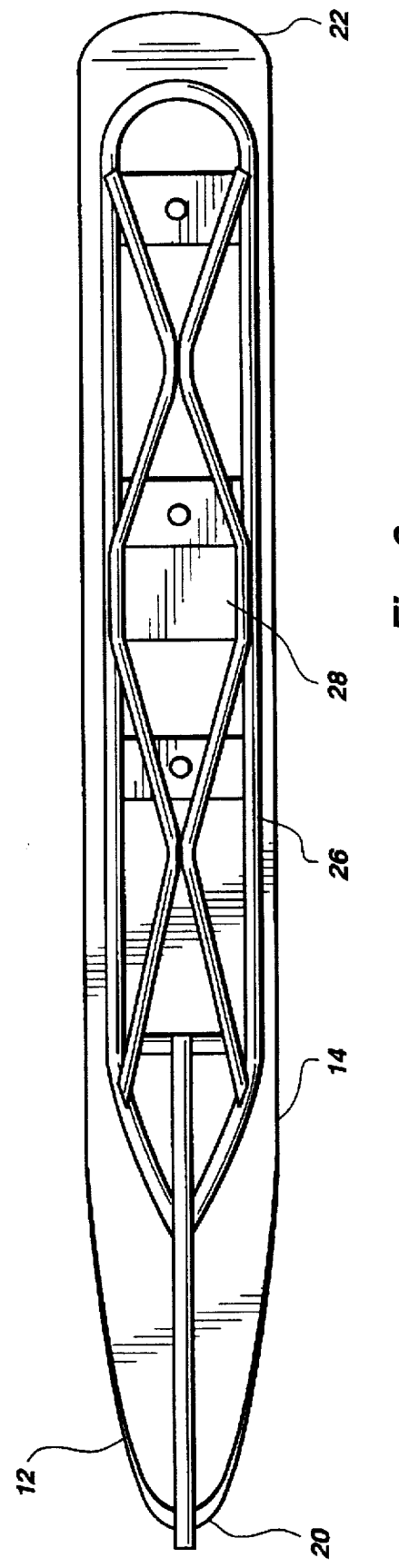

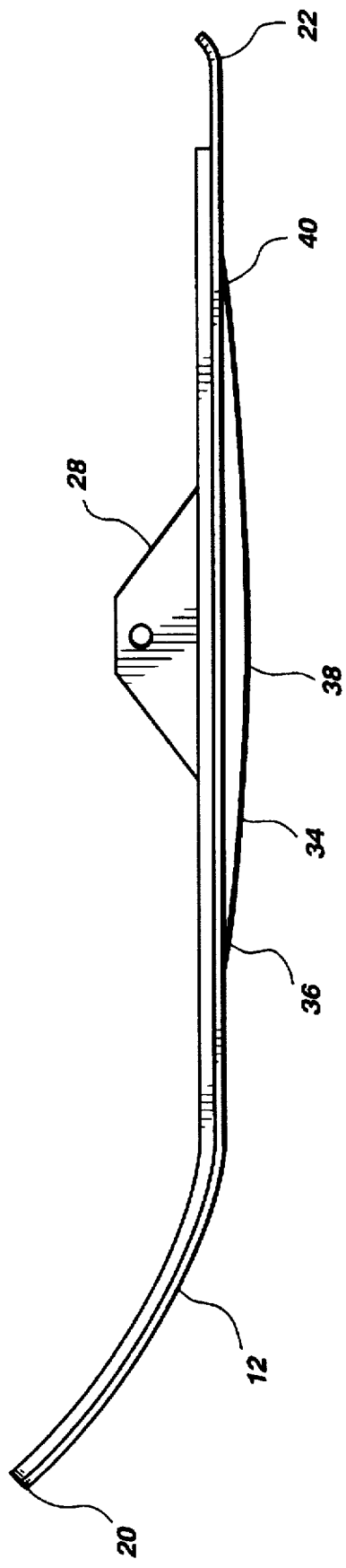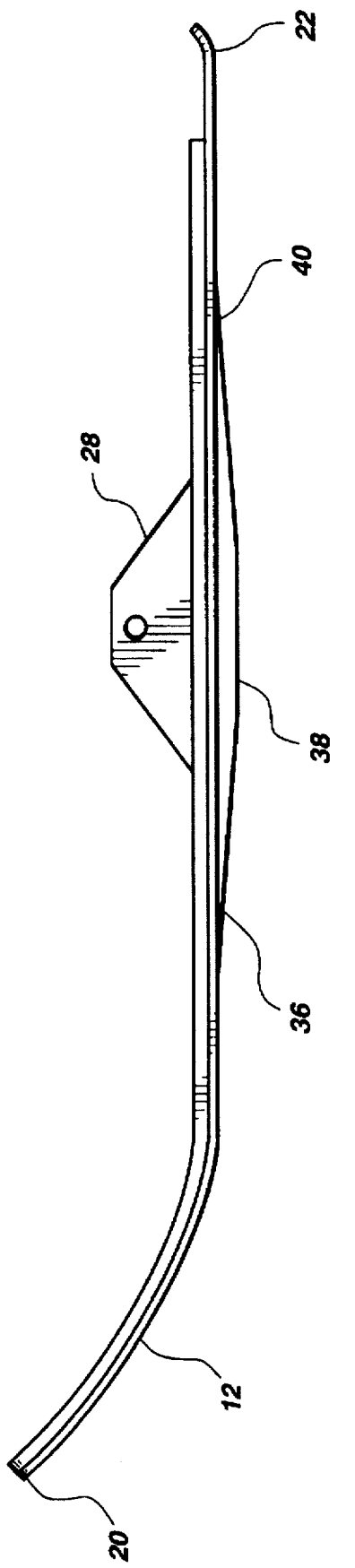

SNOWMOBILE STEERING SKI

This application is a continuation of application Ser. No. 08/106,344, filed Aug. 12, 1993 now abandoned.

BACKGROUND OF THE INVENTION

1. Field

This invention relates to snowmobile skis, and more particularly to steering skis for snowmobiles and similar vehicles.

2. State of the Art

Steering a snowmobile is typically accomplished by a pair of steering skis pivotally attached to the front of the snowmobile. The steering skis glide over the surface of the snow and may be angularly turned from side-to-side in response to movement of a pair of handlebars grasped by a user. The snowmobile generally follows in the direction the skis are pointed.

Under most snow conditions, especially at high speeds, steering skis, when turned, have a tendency to slide sideways, i.e., "plow" forward over the surface of the snow rather than tracking as intended. The turning radius of the snowmobile thus becomes larger than anticipated, and may result in the user hitting something or losing control of the vehicle. If the sliding ski happens to suddenly "catch" in the snow, the momentum of the snowmobile can cause it to overturn and injure the rider. This situation is particularly hazardous under snowmobile-racing circumstances where the snowmobiles are driven at high speed. If a racer does not make a turn as anticipated, or suddenly loses control of his snowmobile, he can cause a high-speed accident, resulting in injury to the racers.

Various methods have been employed to lend increased predictability and control to snowmobile steering skis. One of the more common methods is inclusion of a longitudinal keel along the underside or running surface of the ski. The keel bites into the surface of the snow and enhances steering characteristics, particularly at high speeds.

A keel for a snowmobile steering ski is disclosed in U.S. Pat. No. 3,632,126 to Shorrock. The keel disclosed in Shorrock has a straight running edge, and is adjustable to compensate for wear. U.S. Pat. No. 3,711,109 to Hofbauer discloses a snowmobile steering ski having a very short, curved keel resiliently attached to the ski runner. U.S. Pat. No. 3,643,978 to Westberg discloses a short curved flange which may be attached to the edge of a snowmobile ski, and which is intended to function similar to a keel.

Although the above inventions represent alternatives to a snowmobile ski without a keel, they are subject to several problems. The weight of both the snowmobile and the user is distributed over the flat running surface of the skis in Shorrock, which places a portion of the weight at the ends of the straight keel. This makes the skis difficult to turn and lessens its usefulness. The bite of the keel into the surface of the snow is also distributed over a large area instead of concentrated in the most efficient location directly beneath the steering spindles. The short keel in Hofbauer tends to provide a concentration of weight beneath the steering spindles, but the amount of bite is reduced in soft snow due its short length. Also, because it is hinged, it tends to retract on hard snow pack or on ice, when a keel is very important. The short flange in Westberg also tends to concentrate weight beneath the steering spindles, but since it mounts on the edge of the ski, it actually exacerbates the problem of the ski "catching" in the snow during a turn, causing a loss of control even at moderate speeds. (The phenomenon is similar to the effect of a downhill skier catching a downhill edge during a turn.) Also, such short keels do not provide steering stability during straight runs and show a reduced steering ability in soft snow.

The inventions disclosed in Shorrock, Hofbauer and Westberg bring to light what has heretofore been a dilemma with respect to the design of snowmobile steering skis. Increased positive steering brought about by a long keel comes at the expense of ease of steering. Accordingly, a short keel makes the skis easier to steer, but reduces the amount of positive control. There is a need for a snowmobile steering ski that provides improved controllability and positive turning without a concomitant increase in steering difficulty.

SUMMARY OF THE INVENTION

The snowmobile steering ski of the present application includes an elongated ski having a protruding keel that emerges from the bottom running surface of the ski runner proximal the front end of the ski. The keel gradually increases in its depth of protrusion with respect to the bottom running surface of the ski to a maximum protrusion at a point on the ski bottom which is preferably directly beneath the steering spindles. The keel then gradually decreases in its protrusion depth to merge back into the bottom running surface proximal the rear end of the ski.

Several significant advantages result from the design of the improved snowmobile steering ski. Positive steering is improved because the keel may be made to extend along substantially the entire length of the bottom running surface of the ski. Further, the maximum bite of the keel into the snow is in the most efficient position substantially directly beneath the steering spindles. The ski is easy to turn, however, because the keel design results in a lesser percentage of snowmobile and user weight being distributed at the ends of the keel.

In a preferred embodiment, both the ski and the protruding keel are curved slightly upward away from the snow surface with the curvature of the keel having a slightly smaller radius of curvature than the curvature of the ski. The smaller radius of curvature of the keel causes the ends of the keel to merge into the curved bottom running surface of the ski.

In another embodiment, the ski is curved slightly upward and the keel tapers in either direction from a point of maximum protrusion below the steering spindles into the bottom surface of the ski. In still another embodiment, the running surface of the ski is flat and the keel is curved in a convex shape. In yet another embodiment, the ski runner is flat and the keel tapers in either direction from a point of maximum depth below to the steering spindles merge with the bottom surface of the ski near the front and rear of the running surface of the ski.

Several additional advantages result from a steering ski having a slightly curved bottom running surface. The curved ski runner carries the largest percentage of snowmobile and user weight directly under the steering spindles rather than evenly distributed over the bottom surface of the ski. This produces more positive turning and permits the snowmobile to maneuver faster through a turn without losing steering stability during straight-away runs. The ends of the keel also carry a lesser percentage of weight which makes the ski easier to steer. Keel length, however, may remain long to provide increased positive steering and good tracking during straight runs. Keel penetration is thus concentrated where it is most effective, and reduced near the ends of the ski to provide easier steering.

A further understanding of the improved snowmobile steering ski may be had from the following detailed description together with reference to the drawings.

BRIEF DESCRIPTION OF THE DRAWINGS

FIG. 1 is a side elevational view of one embodiment of a snowmobile steering ski according to the present invention;

FIG. 2 is a plan view of the snowmobile steering ski illustrated in FIG. 1;

FIG. 3 is a side elevational view of another embodiment of a snowmobile steering ski according to the present invention wherein the bottom surface of the ski has a flat running surface and the protruding keel is arcuate;

FIG. 4 is a ski having a substantially flat running surface and a protruding keel having a lower edge defined by three substantially straight lines which give the lower edge a surface approximating a short radius curve;

DETAILED DESCRIPTION OF THE ILLUSTRATED EMBODIMENTS

Figure 5:
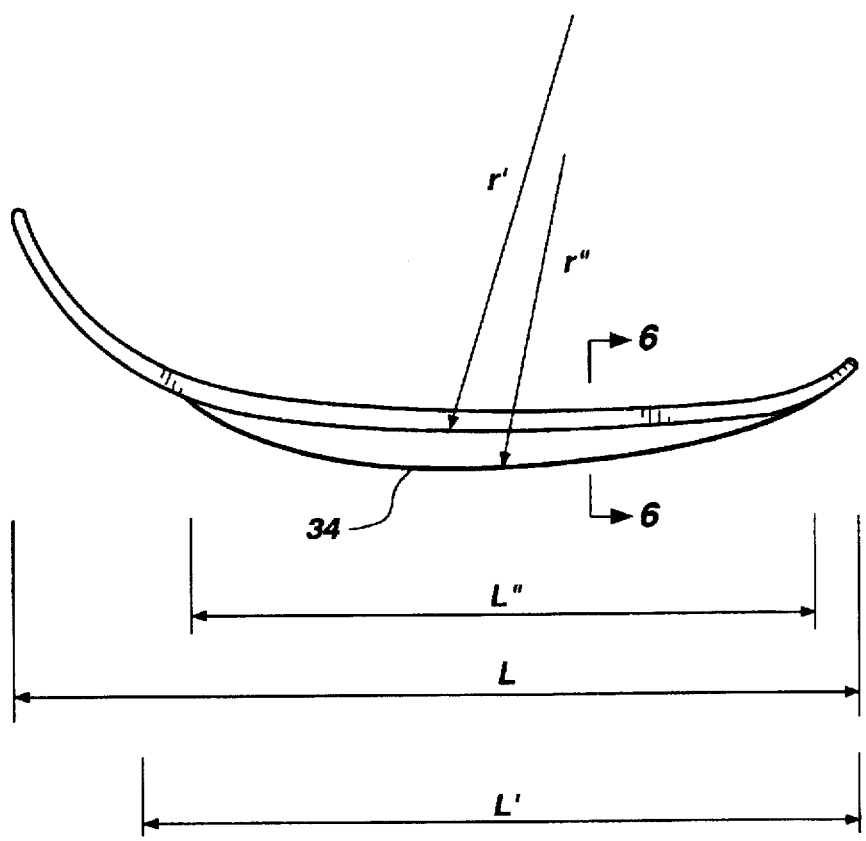
FIG. 5 is an elevational view of a plastic ski having a curved lower running surface and a curved keel.

Referring to FIGS. 1 and 2, a snowmobile steering ski 10 according to the present invention includes an elongated ski runner 12 having a top surface 14, and a bottom running surface 16 structured for gliding over a surface of snow. An upturned front end (ski tip) 20 of the ski runner 12 is intended as a leading tip in the direction of intended ski travel to lift the ski and reduce the tendency of the ski to plow into the surface of snow. A rear end (tail of the ski) 22 distal from the upturned front end is intended as a trailing end of the ski runner in the direction of intended travel.

The snowmobile steering ski 10 includes a frame 26 fixedly attached to the top surface 14 of the ski runner 12. Frame 26 provides structural support to the ski, and includes attachment means 28 for pivotal attachment of the frame to the steering mechanism of a snowmobile. Frame 26 may also include a grab handle 30 structured for grasping by a user when loading or otherwise moving the snowmobile. The frame may be a rigid or flexible structure. The illustrated frame, constructed of light weight tubular members, e.g., of aluminum or steel, is very desirable because of its light weight yet strong structure.

The ski runner 12 includes a protruding keel 34 that extends longitudinally along the bottom running surface 16 of the ski runner. The protruding keel 34 emerges from bottom surface 16 proximal upturned front end 20 at an emergence point generally indicated by reference numeral 36. Emergence point 36 is preferably at the lower portion of upturned front end 20 where the arc of the upturn begins to flatten out into the running surface of the ski runner. Upon emerging from the bottom running surface 16, the projection of protruding keel 34 gradually increases with respect to bottom surface 16 to a point of maximum protrusion indicated generally by reference numeral 38. The point of maximum protrusion 38 is preferably at or near the portion of the ski runner beneath attachment means 28. The depth of protruding keel 34 then gradually decreases from the point of maximum protrusion 38 and merges into bottom running surface 16 at a mergence point generally indicated by reference numeral 40 proximal the rear end 22 of ski runner 12.

In a preferred embodiment illustrated in FIGS. 1 and 2, ski runner 12 has a subtle upward curve along its length, and protruding keel 34 has a similar upward curve but with a slightly smaller radius than the curve in the ski runner. The bottom surfaces of the ski and keel are convex. Preferably, the curved ski runner 12 and curved keel 34 contact the snow surface with the mast force (weight) directly below the steering spindles of the snowmobile. The ends of the ski runner and keel thus curve upward away from the snow surface. This arrangement causes a greater percentage of forward weight of the snowmobile and user to be carried directly below the steering spindles where positive turning efficiency is enhanced. The ends of the ski runner and keel bear a lesser percentage of weight which results in easier steering characteristics, but because of the ski length and keel length steering stability is excellent as is straight-ahead tracking.

In another alternate embodiment illustrated in FIG. 3, ski runner 12 has a flat, substantially straight (planar) running surface between upturned front end 20 and rear end 22, and protruding keel 34 has a subtle upward curve. This arrangement provides reduced weight at the ends of the keel and maximum keel penetration below the steering spindles, but does not concentrate the snowmobile and user's weight below the steering spindles. Rather, the forward weight of the machine is distributed over the flat (planar) running surface, i.e. bottom surface, of the ski.

In still another embodiment, illustrated in FIG. 4, ski runner 12 has a flat, straight running surface between upturned front end 20 and rear end 22, and protruding keel 34 has a straight bottom edge in its middle and is tapered at each end to merge into the bottom surface of the ski near each end of the ski. The keel of FIG. 4, although comprising portions having straight lower edges, has a lower surface which approximates a curve or arc. The embodiment illustrated in FIG. 4 functions similar to the embodiment in FIG. 3 insofar as weight distribution and keel penetration. The keel is composed of three portions, a front portion which tapers from a zero protrusion to a maximum protrusion where it joins the central portion of the keel.

The lower edge of the front portion of the keel illustrated in FIG. 4 is substantially straight, as in the lower edge of the central portion. The central portion has about the same depth of protrusion along its length. The rear portion of the keel tapers from its juncture with the central keel portion to a zero protrusion at its rear and where it merges with the running surface of the ski. These three portions are substantially the same length although the central portion may be smaller than the other two portions.

In operation, the snowmobile steering ski 10 is fastened to the steering mechanism of a snowmobile using attachment means 28. Typically, the mounting arrangement allows the skis to pivot back and forth in a parallel manner and to rock up and down to enable the skis to maneuver over irregularities in the snow surface. The upturned front end 20 is the leading end in the direction of travel and the upturned portion encourages the ski to glide over the snow surface rather than plowing into it.

When the ski engages the snow surface, the keel penetrates through the surface while the bottom running surface of the ski runner glides over the surface of the snow. In response to the handlebars attached to the steering mechanism being turned, both steering skis turn in the same direction as the handlebars. The keel moving below the surface provides a lateral surface which bites into the snow to provide increased positive steering over the mere frictional contact between the ski runner and the snow surface. Maximum penetration of the keel at a point on the ski runner directly below the steering spindles permits the ski to turn efficiently with minimal sliding, while the reduced protrusion of the keel at the ends permits the ski to turn easily.

In a preferred embodiment of the instant invention, the length of the keel is from about 20 to about 30 inches with an effective radius of curvature of from about 60 to about 100 inches. By effective curvature of radius, it is intended to include keels wherein the keel shape approximates a curved surface with that assigned radius of curvature, such as a surface formed by a series of three connected straight lines, as described hereinabove with respect to FIG. 4, or a compound curved keel wherein the curved surface is described by two or more radii or a curve described by radii with different focal points or a curvilinear surface.

The ski itself, as indicated hereinabove, is preferably curved, having a radius of curvature of about 150 to about 190 inches over that section of the ski from behind the top through the trailing end. Such a ski preferably has a total length of about 18 to about 45 inches, with a length of about 24 to 40 inches being preferred.

In a particularly advantageous embodiment of the invention, both the ski and the keel are curved with the ski having a radius of curvature which is slightly greater than that of the keel.

Although the ski may be made of metal, reinforced plastic may be used, wherein the fibers are fiberglass or graphite fibers, or other fibers. A particularly preferred material is an injectable or formable thermoplastic resin such as high density polyethylene or the like, which may or may not be fiber reinforced.

Figure 6:
FIG. 6 is a cross-sectional view of the ski of FIG. 5 along section lines 6—6.
Figure 7:
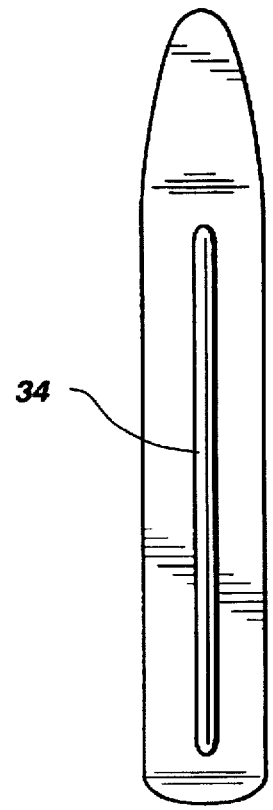
FIG. 7 is a plan view of the bottom surface of the ski of FIG. 5.

A preferred plastic ski has the keel molded as an integral part of the ski. Such a ski is illustrated in FIG. 5, an elevational view (profile), the ski running surface having a length (L') of about 30 inches and a radius of curvature (r') of about 172 inches. The keel has a length (L") of about 30 inches and a radius of curvature (r') of about 95 inches. The overall length (L) of the ski, including tip is about 38 to 40 inches. A bottom view is illustrated in FIG. 7, wherein the keel is a molded U-shaped element having a length of about 24 inches and a radius of curvature of about 90 inches. The ski has a width of about five inches at its mid-section with the keel having a width and a maximum depth of about one inch and about one inch, respectively. A cross-sectional view of the ski near its mid-section is illustrated in FIG. 6 wherein the generally U-shaped keel 34 is illustrated. The keel, if desired, may extend into the top of the ski.

The width of a typical ski is from about four to about six inches, especially skis which have lateral running surfaces. The ski of the instant invention has many advantages. It has excellent lift in deep snow and the curved keel provides excellent steering control, both during turning and when running straight at high speeds.

The U-shaped keel may be fitted with a wear strip of a hard metal. The unprotected plastic ski, however, including the keel, has excellent abrasion and wear resistance.

A particular advantage of the high density polyethylene material, besides its abrasion and wear resistance is its low friction surface. The curved configuration of the ski along its length is particularly effective for a plastic ski.

The ski, as well as the keel, may have a "curvature" which is approximated by straight lines as a profile of the "running surface " of the ski, i.e. that portion of the ski between the curved tip (front end) and tail, which may also be curved upwardly. The running surface may include the trailing end (tail) wherein the curvature of the tail is the same or about the same as the curvature of the ski.

Generally, the maximum protrusion of the keel is from about one-half to about two and one-half inches below the running surface of the ski, however, a preferred depth for recreation snowmobiles generally is less than one and one-half inches. The width of the keel may be any convenient width consistent with providing the keel with good strength for the particular material involved and the manner in which the keel is formed. The width of keel is to provide turning aggressiveness, i.e. a narrower keel will grip more effectively. A wider keel is more forgiving during steering and requires a lower level of expertise. Extending the keel into the ski top may improve the structural strength of a plastic ski.

Thickness of a ski is determined by desired wearability and weight. Many plastic and metal skis have the keel molded or formed as an integral part of the ski, as illustrated in FIGS. 5, 6 and 7. The thickness, in such an instance, is consistent with the formability of the material. Preferred thickness is about one-quarter inch although thicker skis may be made.

The ski of the instant invention has many advantages. It has excellent lift in deep snow and the curved keel provides excellent steering control, both during turning and when running straight at high speeds.

Figure 8:
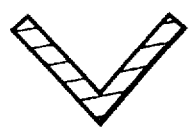
FIG. 8 is a lateral cross-sectional view of a ski having a deep V-shaped keel which is arcuate along the length of its lower edge.
Figure 9:
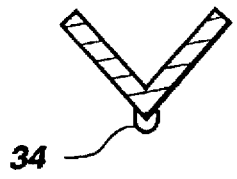
FIG. 9 is a lateral cross-sectional view of a ski wherein the running surface is a deep V-shape surface wherein the lower edge of the "V" is curved along its length.
Figure 10:
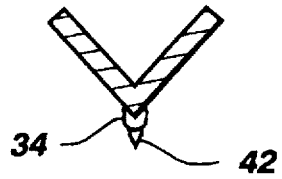
FIG. 10 is a lateral cross-sectional view of a ski having its running surface in a deep V-shape with a wear bar attachment wherein the lower edge of the deep "V" and the wear bar is curved along its length.

FIGS. 8, 9 and 10 are cross-sectional views similar to FIG. 6 showing other embodiments of the invention in which the keel is shaped to approximate a curve along its lower surface.

The ski illustrated in FIG. 8 in a side elevational view could be substantially the same ski as shown in FIG. 2, FIG. 4 or FIG. 5. The keel 34 illustrated in FIG. 8 or 9, in cross-section, is a solid, V-shaped keel which has lateral running surfaces on either side of the keel. The keel, in contrast to the keel illustrated in FIG. 6, has a sharp edge along its lower surface, thus being particularly suitable for an icy or hard packed surface. The running (bottom) surface of the ski of FIG. 8 may be straight (flat) along its length, although it is preferably curved to some extent. The keel, however, is curved along its length with the greatest protrusion of the keel from the running surface of the ski being about the mid-point of the running surface. The keel of FIG. 8 is formed by the convergence of the V-shape running surfaces while the keel of FIG. 9 protrudes slightly from said convergence of surfaces.

The ski illustrated in FIG. 9 has a keel/running surface which is combined in a deep U-shape when viewed in a lateral cross-section. The ski illustrated in FIG. 10 is substantially identical to the ski shown in FIG. 9, except that a wear bar 42 constructed of titanium carbide or other very hard, wear-resistant metal is attached, preferably in a replaceable manner, along the lower edge of the keel.

The skis of FIGS. 9 and 10 have a lower keel surface or edge which is curved along its length. The running surface of the skis on either side of the keel may be located at an included angle ($\alpha$) with respect to one another from less than about 180° to about 60° with an included angle of about 120° to 75° being preferred for icy conditions, especially on racing machines.

A ski having the cross-sectional configuration of the ski of FIG. 10 with a straight keel lower edge has been previously developed and is in current use on racing snowmobiles. The generally V-shape of the skis prevents edges from catching in high speed turns and helps the skis to bite into hard pack snow. The improvement of this invention to such skis is to improve steering performance by constructing skis having a cross-sectional configuration like FIG. 10 with a curved lower edge along its length, preferably a ski having radii of curvature as that set forth hereinabove.

The lower edges of the skis of FIGS. 8, 9 and 10 are convex in shape giving the keel the appearance of a rocking chair runner.

The V-shaped skis illustrated herein are generally narrower than the ski described herein above having a lateral cross-section which is relatively straight across, i.e., lateral running surfaces located in substantially the same plane. The V-shaped skis are generally used for racing machines and have a narrower width, for example, the width is from about two to three inches.

The novel shaped skis of the instant invention have a lower curved, convex edge about one-half to about one inch below the lowest running surface of the ski. Deeper keels, however, may be used, for example, keels up to two inches or more may be useful especially for racing machines. The width of the keel may be any convenient width consistent with providing the keel with good strength for the particular material involved and the manner in which the keel is formed. Many plastic and metal skis have the keel molded or formed as an integral part of the ski, as illustrated in FIG. 6. The width, in such an instance, is consistent with the formability of the material. A plastic material having a thickness of about one-fourth inch may have a keel width of from about three-fourths to about one inch or more.

Although the skis illustrated and described hereinabove have a central longitudinal keel, a double-keel arrangement may also be constructed to employ the structure of the instant invention.

Figure 11:
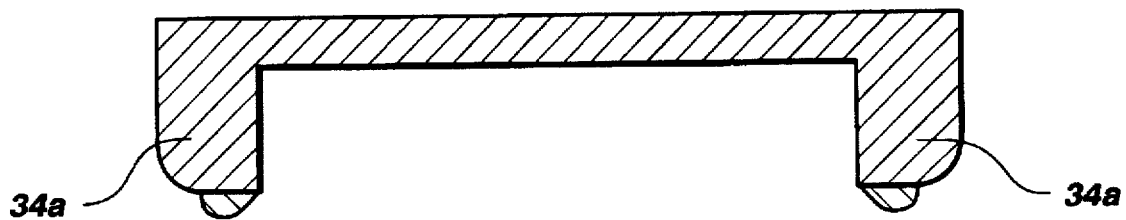
FIG. 11 is a lateral cross-sectional view of a ski with a substantially flat or planar running surface and a pair of elongated keels with convex shaped lower edges located along each outer edge of the ski.
Figure 12:
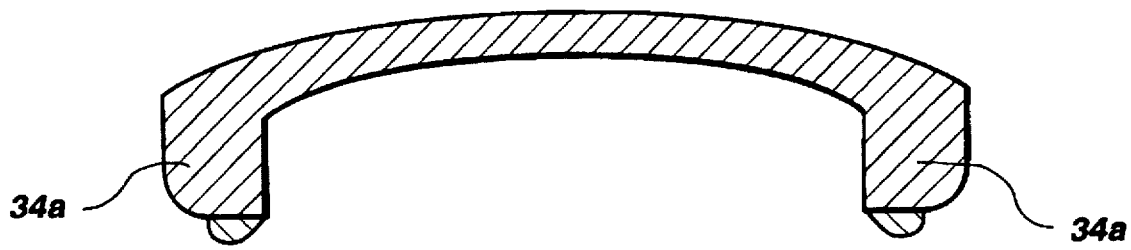
FIG. 12 is a lateral cross-sectional view of a ski substantially identical to the ski of FIG. 11 except that the running surface is arched to provide an elongated running surface which is laterally concave in shape.

Double-keel skis which have substantially flat running surfaces and a straight lower-edged keel and having the shape shown in lateral cross-section in FIG. 11 and 12 have been developed by inventor, although without being put into commercial use. Since the keels exist on both the inner and outer sides of the steering ski, the control problems associated with a ski having only a short, deep outboard keel are generally avoided.

Although skis having substantially flat (straight) running surfaces and keel edges along their length are useful, a double-keel configuration wherein the keels are curved in a convex manner, as explained above with regard to skis having a single, central keel, are preferred.

Skis employing curved double keels may have flat or curved bottom running surfaces and may be made of metal, plastic or other strong, smooth material.

A ski of the instant invention is preferably laterally symmetrical about a vertical plane passing through its longitudinal axis. It preferably has a keel which is a continuous structure from its front to rear end. The keel is also preferably laterally symmetrical about a vertical plane passing through its central longitudinal axis.

Snowmobile steering skis having keels with a lower curved surface along their length are particularly useful for providing excellent steering control in virtually all snow conditions from deep powder to ice. The curved keel works especially well on skis which have a curved bottom running surface.

Although the invention has been described and illustrated herein with a certain degree of particularity in structure, this has been for purposes of illustration of the principles of the invention, and is not intended to limit the invention in any way. It should be understood that various changes and modifications may be made without departing from the spirit and scope of the following claims.

What is claimed is:

1. An improved snowmobile ski for attachment to the steering mechanism of a snowmobile comprising:
    an elongated member having a turned-up front end and an aft end, wherein said member has:
        a bottom running surface extending from the turned up front end to the aft end; and
        an upper surface having means for attachment directly or indirectly to the steering mechanism of a snowmobile; and
        a keel molded as a part of said member and protruding from the bottom running surface of said ski, said keel being substantially the same length as said running surface and having a generally curved shape along its lower edge with its maximum protrusion proximate that portion of the ski which is structured to be below the steering attachment of the snowmobile, said keel protrusion diminishing in both fore and aft directions from said keel maximum protrusion to a substantially zero protrusion at its fore and aft ends.

2. The improved snowmobile ski of claim 1, wherein said running surface of said ski on either side of said keel is substantially flat along its length.

3. The snowmobile steering ski of claim 1, wherein said bottom running surface of said elongated member is curved upward from said front end to said aft end wherein said curve conforms substantially to an arc of a large radius circle.

4. The improved snowmobile ski of claim 1, wherein said running surface of said ski on either side of said ski is a curved surface approximating a narrow section of a large radius cylindrical surface.

5. The snowmobile steering ski of claim 3, wherein said keel has an effective radius of curvature which is smaller than the radius of curvature of said elongated member.

6. The improved snowmobile ski of claim 1, wherein said ski in lateral cross-section has a substantially V-shape.

7. A snowmobile steering ski assembly comprising:
    a frame for providing structural support to said ski and having attachment means for attachment of said frame to the steering mechanism of a snowmobile; and
    an elongated ski fixedly attached to said frame and having a curved bottom running surface having a first radius of curvature and structured for gliding over a surface of snow, an upturned front end having a relatively short radius of curvature, a rear end distal from said from end, and a curved protruding keel having a second effective radius of curvature smaller than said first radius of curvature of said bottom running surface, said protruding keel gradually emerging from said bottom running surface proximal said front end and extending along a portion of said length of said ski runner and gradually merging into said bottom running surface proximal said rear end and wherein said keel is molded as a part of said bottom running surface.

8. The snowmobile steering ski assembly of claim 7, wherein said frame includes a grab handle structured for grasping by a user.

9. The snowmobile steering ski assembly of claim 7, wherein the protrusion of said keel gradually increases relative to said bottom running surface of said ski runner from the front end along said length of said ski runner to a maximum protrusion at a point on said ski runner proximal said attachment means of said frame means to said snowmobile steering mechanism, whereupon the protrusion of said keel decreases along said length of said protruding keel and gradually merges into said bottom running surface of said ski runner.

10. The snowmobile steering ski assembly of claim 7, wherein said elongated ski is plastic.

11. A curved plastic snowmobile ski having a front-tip end and an aft end with a bottom running surface therebetween, said bottom running surface being an elongated, rocker-shaped surface between said front tip end and said aft end, said rocker-shape surface having a radius of curvature of about 150 to 190 inches and a protruding keel molded into said rocker-shaped bottom surface, said keel having an elongated, rocker-shaped bottom surface curved to a radius of curvature significantly less than the radius of curvature for said bottom running surface.

12. The curved plastic ski of claim 11, wherein said ski is constructed of a plastic material of a type and thickness which imparts significant flexibility to said ski.

13. The improved snowmobile ski of claim 1, wherein said keel at its maximum protrusion has a depth which is at least about one half inch below the bottom running surface.

14. The improved snowmobile ski of claim 1, including means for attaching a wear bar to the underneath surface of said keel.

15. The improved snowmobile ski of claim 1, wherein said keel has a width of at least about one inch.

16. The improved snowmobile ski of claim 1, wherein said keel has a generally U-shaped cross section.

17. The improved snowmobile ski of claim 1, wherein said keel has a protrusion at its maximum depth of at least about one inch.

18. An improved snowmobile ski for attachment to the steering mechanism of a snowmobile comprising:
  an elongated runner member having a turned-up front end and an aft end wherein said member has:
    a bottom running surface extending from the turned-up front end to the aft end;
    an upper surface having means for attachment directly or indirectly to the steering mechanism of a snowmobile; and
    a longitudinally-oriented, rocker-shaped keel molded as a part of said bottom running surface of said member, said keel being about the same length as said bottom running surface with the maximum protrusion of said rocker-shaped keel proximate that portion of the ski which is structured to be below the steering attachment of the snowmobile when said ski is attached to a snowmobile, said keel having a substantially reduced protrusion at the ends of said keel.

19. The ski of claim 18, wherein said keel has means for attachment of an elongated wear bar member to the bottom surface of said keel.

20. The ski of claim 19, wherein said ski has a wear bar attached and where in said wear bar conforms to the, curvature of said keel.

* * * * *